United States Patent [19]

Darling

[11] Patent Number: 5,494,303
[45] Date of Patent: Feb. 27, 1996

[54] SELF-CENTERING INDEXING CHUCK

[75] Inventor: John S. Darling, Southington, Conn.

[73] Assignee: Royal Machine and Tool Corporation, Berlin, Conn.

[21] Appl. No.: 399,908

[22] Filed: Mar. 7, 1995

[51] Int. Cl.⁶ .................................................. B23B 31/34
[52] U.S. Cl. ............................................................. 279/5
[58] Field of Search ..................................... 279/5

[56]  References Cited

U.S. PATENT DOCUMENTS

| | | | |
|---|---|---|---|
| 2,480,715 | 1/1948 | DeGraff | 279/5 |
| 2,621,937 | 8/1949 | Hunziker | 279/5 |
| 2,643,132 | 9/1950 | Hunziker | 279/5 |
| 2,732,216 | 6/1953 | Sloan et al. | 279/5 |
| 4,209,181 | 6/1980 | Morawski | 279/5 |
| 4,411,440 | 10/1983 | Becker | 279/5 |
| 4,747,609 | 5/1988 | Scharfen | 279/5 |

*Primary Examiner*—Steven C. Bishop
*Attorney, Agent, or Firm*—Hayes & Reinsmith

[57]  ABSTRACT

A rotatable chuck or work holder is provided with a pair of opposed jaws operated for simultaneous movement toward and away from each other and the centerline of rotation of the chuck to effect self-centering action of a workplace held between the chuck jaws. One of the chuck jaws has a rotatable and indexable work holding insert and the other having a rotatable work holding insert which cooperate to permit controlled rotation of a work piece held therebetween without releasing the grip on the work piece.

11 Claims, 3 Drawing Sheets

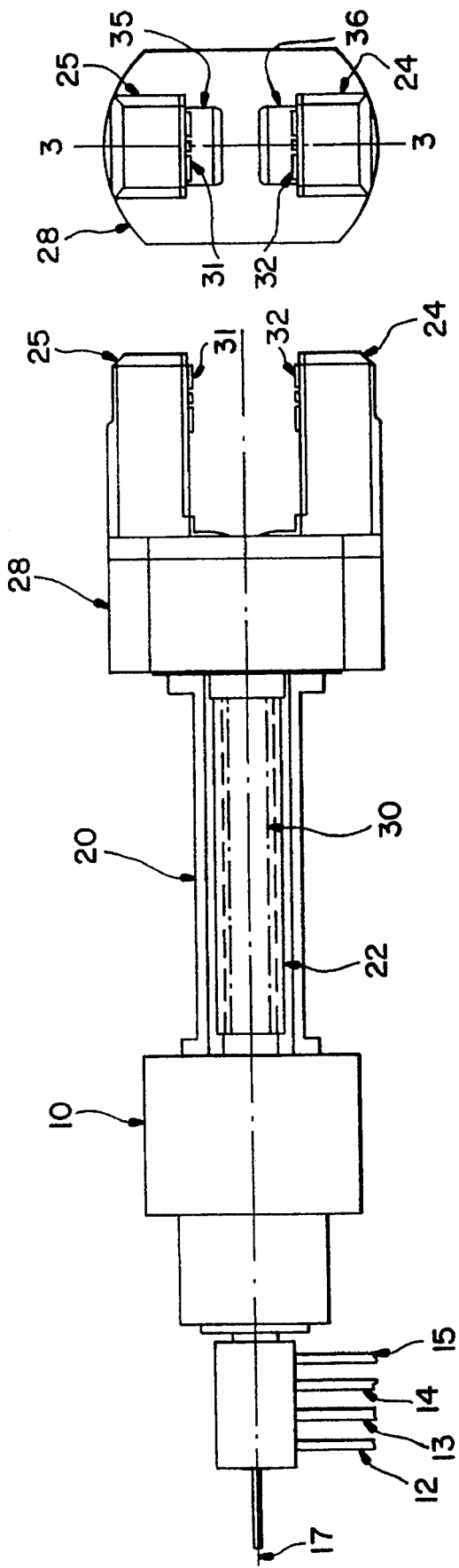

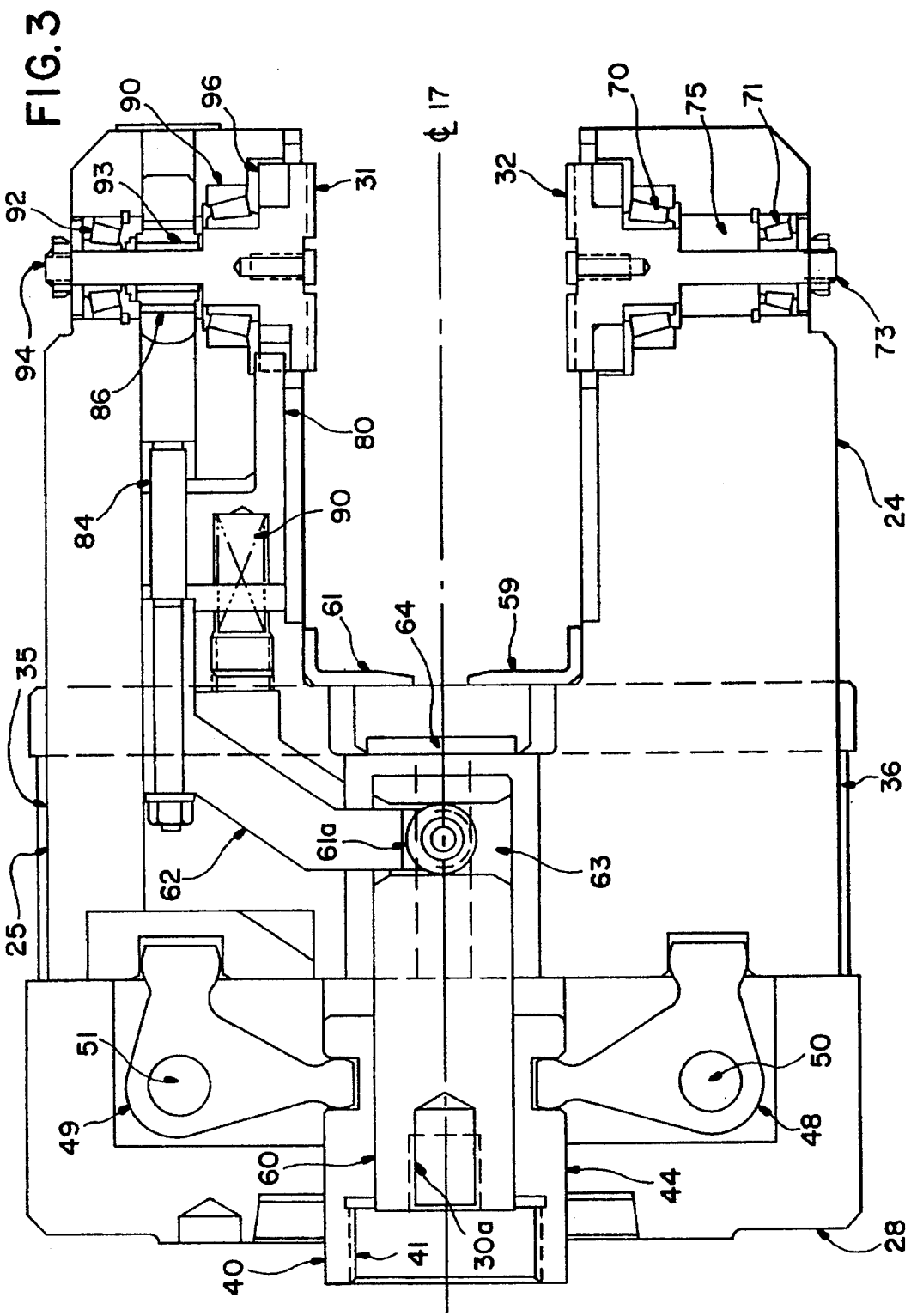

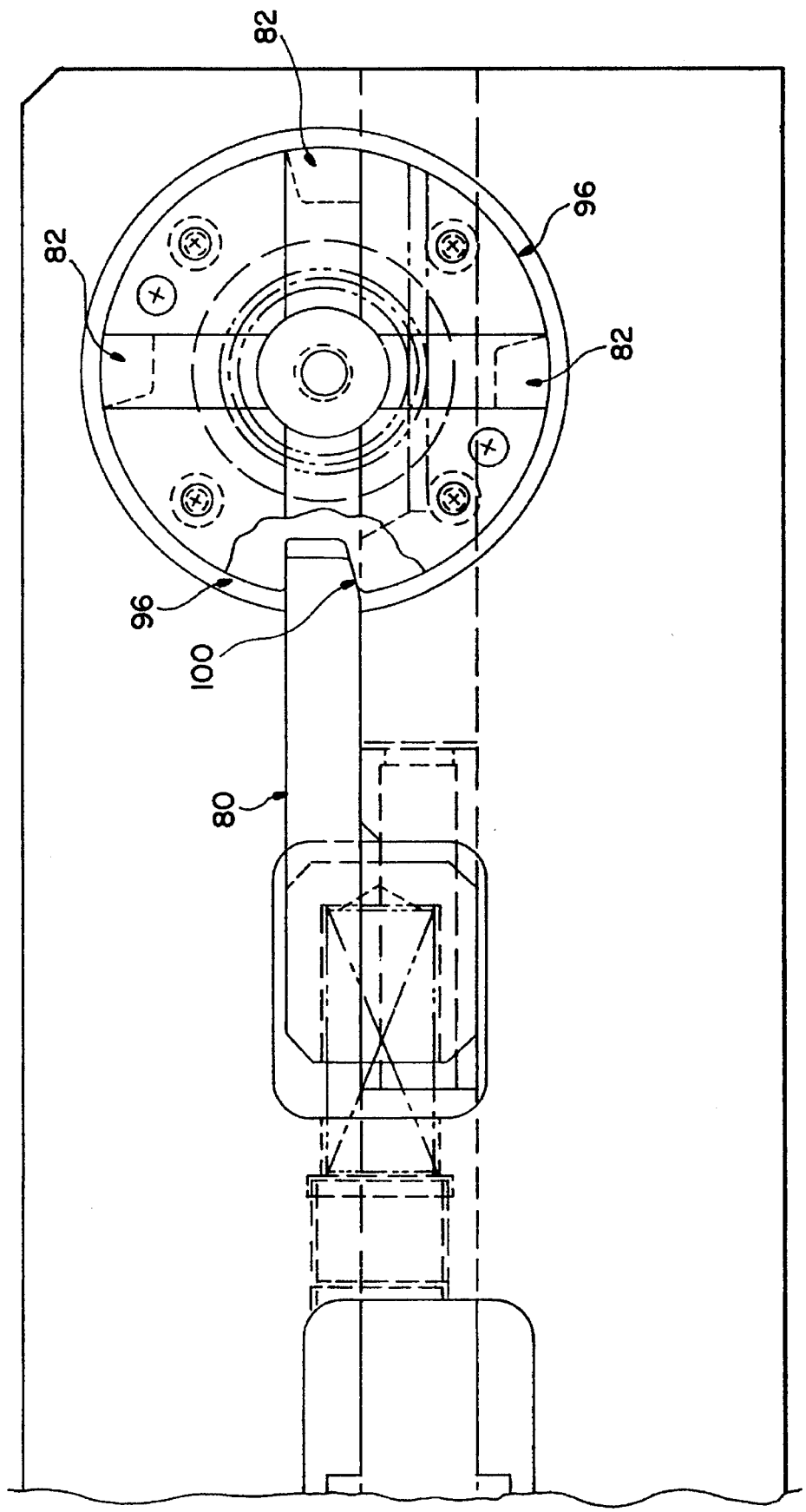

5,494,303

SELF-CENTERING INDEXING CHUCK

FIELD OF THE INVENTION

This invention relates to chucking devices for holding machine tool work pieces and more particularly to self-centering work piece chucking apparatus having particular utility for use with machine tools capable of performing multiple-axis machining operations.

BACKGROUND OF THE INVENTION

Work holding devices for use in machine tool operations are part of an old and highly developed art and it is known to generally provide for such chucking devices which are self-centering to position the work piece relative to the axis of rotation of the machine tool and chucking device and also for indexing devices which can be used in connection with multiple jawed chucking devices to facilitate multiple axis machining. Devices of this general type are not always suitable for the high speeds of modem machine tools to provide the desired reliability. It is also known in the prior art to use draw bars and draw tubes to effect actuation of chuck jaws and accessory devices but all of such prior art is not been developed for high speed multiple axis auto indexing of machine tools' as is required for today's complex machine tool center operations.

OBJECTS OF THE INVENTION

It is a principal object of this invention to provide an improved chuck having opposed work holding jaws each having a rotatable jaw insert to permit controlled rotatable movement of a work piece held between the jaw inserts without releasing the work piece grip of the work holding jaws.

It is a further object of this invention to provide an improved chuck having opposed work holding jaws with rotatable work engaging inserts, one of the inserts being indexable on a controlled basis to effect incremental work piece rotation and including means for locking the indexable insert in the desired position.

It is an additional object of this invention to provide an improved self-centering work piece having a pair of opposed jaws which grip the work piece, each of the jaws having an insert for engaging and gripping the work piece for rotation without releasing the grip of the jaw on the work piece so as to permit machining of multiple operations.

It is a further object of this invention to provide a chuck of the self-centering indexing type having a simplified operating mechanism to permit facile power operation while reducing cost and permitting mass balancing of the chuck for high speed rotation.

It is still a further object of this invention to provide a work piece holding chuck that is not only balanced for high speed rotation about its center line but has two opposed self-centering jaws, each having a rotatable jaw insert one of the jaws contains an indexing mechanism for incrementally and selectively rotating a work piece placed between the jaw inserts without release of the work holding jaw pressure.

It is an additional object of this invention to provide a self-centering work indexing chuck having a simplified mechanical jaw operating system which is easily adapted to provide for automated hydraulic operation without requiring significant modification.

Other objects will be in part obvious and in part pointed out more in detail hereinafter.

A better understanding of the objects, advantages, features, properties and relations of the invention will be obtained from the following detailed description and accompanying drawings which set forth certain illustrative embodiments and are indicative of the various ways in which the principles of the invention are employed.

SUMMARY OF THE INVENTION

A preferred embodiment of this improved chuck provides a chuck or work holder suitable for rotation having a pair of opposed jaws operated for simultaneous movement toward and away from each other and the centerline of rotation of the chuck to effect self-centering action of a workplace held between the chuck jaws, one of the chuck jaws having a rotatable and indexable work holding insert and the other having a rotatable work holding insert which cooperate to permit controlled rotation of a work piece held therebetween without releasing the grip on the work piece. The jaw supporting the indexable insert houses the indexing operating mechanism while preserving mass balance for the chuck for rotation about its central axis, power operation of the jaws and the indexable insert is provided.

DESCRIPTION OF THE DRAWINGS

FIG. 1 is a schematic elevation view of the hydraulic operating mechanism for a preferred embodiment of the chuck of this invention;

FIG. 2 is a top plan view of the chuck of FIG. 1;

FIG. 3 is a cross section view of the chuck taken along the lines 3/3 of FIG. 2; and FIG. 4 is a partial cross section view of one jaw of FIG. 3.

Turning now to the drawings particularly to FIGS. 1 and 2 for an overall understanding of the invention, it is seen that the numeral 10 generally refers to a schematic of a double pressure cylinder for powering the chuck of this invention and includes by way of explanation two independent pressure cylinders for operating the mechanism of this invention, the cylinders not being shown in the drawing except to show that there are hydraulic lines or air 12, 13, 14 and 15 which supply power to the double pressure cylinder 10, the entire mechanism being supported for rotation about center line 17, a common center line for the chuck mechanism and the chuck operating mechanism which is supported in any suitable manner on the machine tool for rotation about the center line.

Double pressure cylinder 10 (and the operating piston) is connected to housing 20 which contains a draw tube 22 (shown in dotted lines) for operating the main chuck jaws 24 and 25 mounted on chuck body 28. The "dash dot" lines illustrate the draw bar 30 which is supported coaxially with draw tube 22, draw bar 30 serving as the operating mechanism for rotating the indexing inserts 31 and 32 as hereinafter described.

FIG. 2 shows a top plan view illustrating chuck body 28 as supporting jaws 24 and 25 and the inserts 31 and 32. Suitable slots 35 and 36 are formed in chuck body 28 to accommodate the movement of jaws 24 and 25.

Turning next to FIG. 3, which is a cross section of the chuck assembly taken generally along the lines 3—3 of FIG. 2, it is seen that draw tube 22 connects to actuator 40 with a threaded or other suitable connection 41, actuator 40 being housed within chuck body 28 and supported for movement in a suitable passageway generally indicated at 44. Jaw operating levers 48 and 49 are pivotally on chuck body 28 supported as at 50 and 51, which levers move master jaws 24 and 25. Actuator 40 engages one end of each lever 48, 49 whereas the other end of that lever engages the master jaw 24, 25 with which it is associated. Such is a fairly typical arrangement to be found in the prior art whereby movement of the levers are in effect automatically synchronized by movement to the actuator 40 to bring about synchronized but oppositely directed movement of master jaws 24, 25 to effect self-centering operation to grip a work piece. Such an arrangement with master jaws supported on a chuck body for movement toward and away from each other under the influence of operating levers connected between the master jaws and a draw tube is a matter that is also known in the art. Slots 35 and 36 (see FIG. 2 and FIG. 3) are provided in the chuck body 28 to accommodate the limit movement of master jaws 24, 25 toward and away from center line 17, there being provided suitable covers 59 and 61 for the slots to limited ingress of chips and other foreign matter into the slots to interfere with jaw movement.

To effect controlled rotation of a work piece held between jaw inserts 31 and 32, there is provided a separate power actuated mechanism having significant mechanical features best seen in FIG. 3 wherein it is seen that draw bar 30 is connected to inner actuator 60 with an appropriate threaded connection as at 30a. Inner actuator 60 is received in and slides within actuator element 40 for movement relative thereto in accordance with the movement of draw bar 30 under the influence of the pressure (hydraulic or pneumatic) actuator 10. Inner actuator 60 can be formed from suitable rod or bar stock and is provided with a radially extending slot 63 adjacent the end opposite to the draw bar connection that engages roller 61 a supported on arm 62 secured to inner actuator 60; it is noted, for completeness, that inner actuator 60 is accorded limited movement along center line 17 by an appropriately covered recess 64 in chuck body 28, cover elements 61 and 59 serving to keep metal chips and the like out of the operating mechanism.

Before proceeding with the specifics of the actuating mechanism for indexing jaw insert 31, it is believed appropriate to note that jaw insert members 31, 32 are supported in their respective jaws 24, 25. Jaw insert 32 is supported for rotation by thrust bearings 70 and 71 carded by jaw 24 which engage an axle 73 extending from jaw insert 32 thereby permitting jaw insert 32 to freely rotate in the recess 75 provided in master jaw 24.

Turning now to a further examination of FIG. 3 and FIG. 4 in detail, the inner actuator 60 is in the full forward position (see more particularly FIG. 4) wherein latch member 80 is fully engaged in one of the four circumferentially spaced slots 82 to establish the locked position for insert 31. As the indexing cycle starts, inner actuator 60 is moved axially toward the rear of chuck 28. Rack 84 and index plate 96 remain in the fixed position until rack 84 begins its movement to rotate gear 86.

At this point it should be noted that insert 31 is supported for rotation in much the same way as insert 32 with the thrust bearings 90 and 92 supporting spindle 94; however gear 86 is appropriately fastened through locked clutch 93 the spindle 94 for rotation therewith in unison. One way roller clutch 93 becomes disengaged from spindle 94 with the clockwise rotation of gear 86. As rack assembly 84 continues its movement, latch 80 compresses the spring 90 such that the latch 80 becomes disengaged from index plate 96. As inner actuator 60 reverses its direction of movement under the influence of draw bar 30, the actuator arm of inner actuator 60 moves in the opposite direction thereby to rotate the gear 86, and upon rotation of gear 86, one way roller clutch 93 engages so as to rotate index spindle 94 and insert 31. As rack 84 continues forward movement latch 80 is pushed forward (to the right as seen in FIG. 3) which causes latch 80 to make contact with the outside diameter of index plate 96. Such contact on the periphery of index plate 96 by latch 80 causes a braking effect to help prevent over run of the index spindle such that rotation continues only until latch 80 re-engages the next slot 82 in index plate 96 so as to complete a single indexing cycle for insert 31 and any work piece held between inserts 31 and 32.

From the foregoing description of a single index cycle it is seen that the present invention provides a purely mechanical drive with power actuation to effect the desired indexing action, which action is of course controlled by the index pin and the index plate. It is noted for completeness that the index pin has a tapered shoulder 100 to facilitate engagement with the slot 82 of index plate 96 in the desired direction of rotation.

As is quite clear from FIGS. 3 and 4, the indexing mechanism as it is actuated by the draw bar is contained within one master jaw and is preferably configured so as to maintain mass balance for the entire chuck assembly for rotation about the centerline 17. There is no specific limitation on size and the economy of a simplified number of parts, reduced number of moving parts to produce an indexing chuck which not only is self-centering in its entire combination but which is also exceedingly simplified in construction, lower in cost, and reliable in operation.

I claim:

1. Self-centering work piece chucking apparatus having particularly utility for use with machine tools capable of performing multiple axis machining operations comprising:

a chuck body for support on a machine tool and having a center line of rotation;

a pair of opposed jaws supported on said chuck body for movement radially thereof and perpendicular to said centerline of rotation;

the operating mechanism for said jaws including a pair of opposed generally "L" shaped levers pivotally connected intermediate the end thereof to the chuck body, having one end of each of said levers connected to a jaw and the other end engageable with an operating mechanism to effect simultaneous radial movement said jaws toward and away from each other to effect self-centering work gripping action of the jaws relative to the chuck body centerline of rotation;

first and second work piece engaging elements, each said element being supported for rotation on each jaw, each work piece engaging element being supported on its jaw in face to face relationship with the other element for rotation about a common axis that is substantially perpendicular to the center line of rotation;

an index plate fixedly associated with and rotatable with said first work piece engaging element, said index plate having a plurality of notches extending radially thereof;

a latch supported on the jaw and selectively engageable with the notches in said index plate;

a drive gear supported on said first work piece engaging jaw to effect controlled movement of said index plate;

a one-way clutch connected to said drive gear to permit single direction rotation of said index plate and said first jaw;

drive means located in the jaw supporting said first work piece engaging element to engage the drive gear in said first work piece engaging jaw to effect rotation thereof, said drive means including a member to release said latch to permit indexing rotation of said plate.

2. The self-centering chucking apparatus of claim 1 wherein said jaw drive means includes a rack to engage said pinion and said member operable to release said latch and including a one-way clutch disengageable by rotation of said drive gear in a single direction.

3. The self-centering chucking apparatus of claim 2 wherein said rack engages a latch to release said indexing plate for movement.

4. The self-centering chucking apparatus as set forth in claim 3 wherein said latch is a spring loaded element which, when released, rides on the outside of said index plate as it rotates thereby to act as a brake inhibiting uncontrolled movement of said index plate and to prevent over running the next index slot.

5. The self-centering chucking apparatus as set forth in claim 4 wherein an axially draw tube effects opening and closing movement of the self-centering jaws and the rack to effect controlled rotating movement of the jaw is axially moveable by a draw bar arranged coaxially with the draw tube at the centerline of rotation.

6. The self-centering chucking apparatus of claim 5 wherein the draw bar is provided with an apertured end and said rack is connected to said apertured end and housed within the chuck body and the jaw housing said index plate.

7. A mechanism for indexably rotating a work piece held between two chuck jaws mounted on a chuck body, the work piece engaging portions of the two chuck jaws being opposed and rotatably supported on the jaws;

a drive gear and a notched index plate being operatively associated with one of the rotatable work piece engaging portions and housed within one of the chuck jaws;

a clutch permitting rotation of the work piece engaging portion associated with the index plate in a single direction;

a rack located within said one chuck jaw and moveable to effect rotation of said drive gear and index plate;

a latch supported on said one chuck jaw, said latch being releasable upon movement of said rack to permit rotation of the drive gear;

a draw bar extending axially of the chuck body;

a means interconnecting said draw bar and the rack to effect controlled rotation of the work piece held between the work piece engaging portions.

8. The mechanism of claim 6 wherein the chuck body has an axis of rotation and the chuck jaws are power actuated to move in radially opposite directions to effect self-centering action of a work piece held there between.

9. The mechanism of claim 7 wherein the draw bar extending axially of the chuck body extends along the axis of rotation of the chuck body.

10. The mechanism of claim 8 wherein the chuck jaws are moveable by a draw tube extending along the axis of the chuck body and coaxial with the draw bar.

11. The mechanism of claim 9 wherein the chuck body, chuck jaws, and work piece engaging pieces of the two chuck jaws and the operating mechanism therefor are substantially mass balanced for ease of rotation about the axis of the chuck body.

\* \* \* \* \*